United States Patent
Pope et al.

(10) Patent No.: US 10,498,753 B1
(45) Date of Patent: Dec. 3, 2019

(54) SYSTEM AND METHOD FOR IDENTIFYING POTENTIALLY FRAUDULENT DOMAIN NAME AND IDENTIFIERS

(71) Applicant: JPMorgan Chase Bank, N.A., NY, NY (US)

(72) Inventors: Josh Pope, Tampa, FL (US); D. J. Knoedler, Powell, OH (US); Jean-Francois Legault, Brooklyn, NY (US); Robert Pascarella, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 137 days.

(21) Appl. No.: 15/372,797

(22) Filed: Dec. 8, 2016

(51) Int. Cl.
| | |
|---|---|
| *H04L 9/00* | (2006.01) |
| *G06F 21/00* | (2013.01) |
| *H04L 29/06* | (2006.01) |
| *H04L 29/12* | (2006.01) |
| *H04L 29/08* | (2006.01) |
| *G06F 16/951* | (2019.01) |

(52) U.S. Cl.
CPC ........ *H04L 63/1425* (2013.01); *G06F 16/951* (2019.01); *H04L 61/302* (2013.01); *H04L 67/18* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 10,127,388 | B1* | 11/2018 | Popuveniuc | G06F 21/60 |
| 2002/0129013 | A1* | 9/2002 | Thomas | H04L 43/04 |
| 2006/0080437 | A1* | 4/2006 | Lake | G06F 17/30887 |
| | | | | 709/225 |
| 2008/0133540 | A1* | 6/2008 | Hubbard | H04L 63/101 |
| 2011/0055911 | A1* | 3/2011 | Adelman | G06Q 10/107 |
| | | | | 726/7 |
| 2016/0036851 | A1* | 2/2016 | Merza | H04L 63/1441 |
| | | | | 726/22 |
| 2016/0191548 | A1* | 6/2016 | Smith | H04L 63/1416 |
| | | | | 726/23 |
| 2018/0013789 | A1* | 1/2018 | Damian | H04L 63/1483 |

* cited by examiner

*Primary Examiner* — Alexander Lagor
(74) *Attorney, Agent, or Firm* — Hunton Andrews Kurth LLP

(57) ABSTRACT

The invention relates to a method and system that analyzes domain names for potential fraud. The system comprises: a memory that stores and maintains a list of known domain names associated with an entity; and a computer processor, coupled to the memory, programmed to: receive, via an electronic input, one or more registered domain names from a registration source; access the list of known domain names; apply logic rules to determine visually similar domain names by comparing the one or more registered domain names to the list of known domain names; identify a relevant recipient based on the visually similar domain name; and generate and transmit, via a communication interface, a message to the recipient, the message comprising the visually similar domain name and associated information relevant to the domain name registration.

16 Claims, 3 Drawing Sheets

SYSTEM AND METHOD FOR IDENTIFYING POTENTIALLY FRAUDULENT DOMAIN NAME AND IDENTIFIERS

FIELD OF THE INVENTION

The invention relates generally to a system and method for identifying potentially fraudulent domain names, and more particularly to a system and method that identifies visually similar domain names as compared to legitimate ones.

BACKGROUND OF THE INVENTION

Domain name fraud generally involves an attempt to generate revenue or obtain passwords and other proprietary and confidential information by tricking customers into responding to a fake domain name. This may include email fraud, email spoofing, email masking, email hacking, malware attempts that impact clients and their accounts. Domain name fraud translates to lost funds as well as wasted time and resources to address and remedy such actions. In the financial industry, this type of fraud is even more of a concern due to account sensitivity and a risk of unauthorized access to customer accounts and other financial information. These and other drawbacks currently exist.

SUMMARY OF THE INVENTION

According to one embodiment, the invention relates to a computer implemented system that analyzes domain names for potential fraud. The system comprises: a memory that stores and maintains a list of known domain names associated with an entity; and a computer processor, coupled to the memory, programmed to: receive, via an electronic input, one or more registered domain names from a registration source; access the list of known domain names; apply logic rules to determine visually similar domain names by comparing the one or more registered domain names to the list of known domain names; identify a relevant recipient based on the visually similar domain name; and generate and transmit, via a communication interface, a message to the recipient, the message comprising the visually similar domain name and associated information relevant to the domain name registration.

The system may include a specially programmed computer system comprising one or more computer processors, mobile devices, electronic storage devices, and networks.

The invention also relates to computer implemented method that analyzes domain names for potential fraud. The method comprises the steps of: receiving, via an electronic input, one or more registered domain names from a registration source; accessing the list of known domain names; applying logic rules to determine visually similar domain names by comparing the one or more registered domain names to the list of known domain names; identifying a relevant recipient based on the visually similar domain name; and generating and transmitting, via a communication interface, a message to the recipient, the message comprising the visually similar domain name and associated information relevant to the domain name registration.

The computer implemented system, method and medium described herein provide unique advantages to banking customers, according to various embodiments of the invention. The innovative system and method improves fraudulent detection of suspicious domain names. The features of an embodiment of the present invention address problems with fraudulent communications from suspicious domain names that seek to obtain account information and other sensitive customer data. The novel system enables effective and efficient detection of visually similar domain names. The system is able to accurately identify potential fraud and address such issues. Other advantages include customer loyalty and retention due to the increased satisfaction of the account holder. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
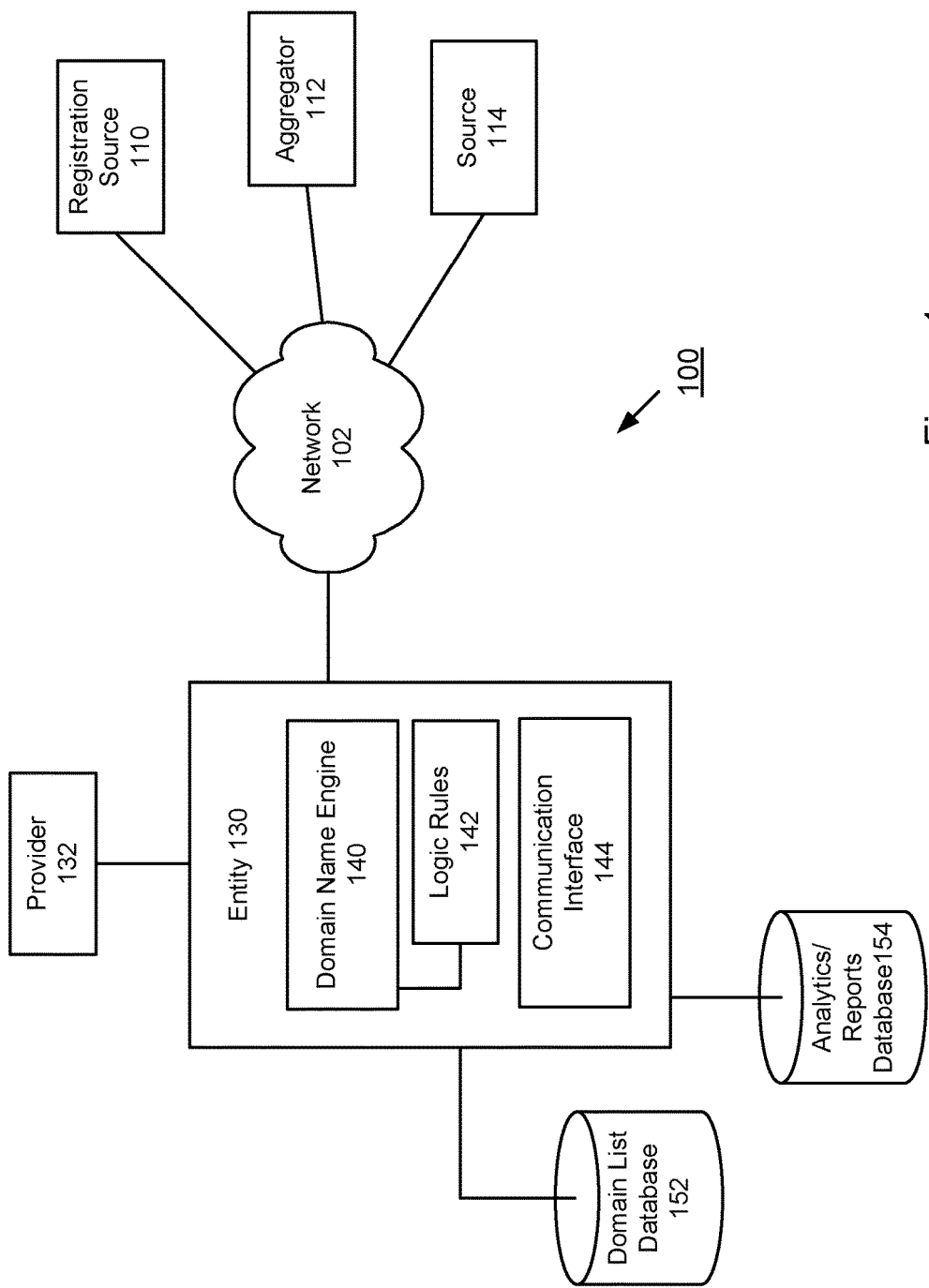
FIG. 1 illustrates a schematic diagram of a system that identifies potentially fraudulent domain names, according to an exemplary embodiment.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to identifying potentially fraudulent domain names by comparing newly registered domain names with a list of authorized domain names. The innovative system applies logic that identifies domain names that appear visually similar and then determines whether the names are authentic or not.

Domain registration involves the process of acquiring a domain name from a domain name registrar. In general, a domain name represents an Internet Protocol (IP) resource, such as a computer hosting a website, for example. Domain name registrar represents an organization or commercial entity that manages the reservation of internet domain names. Domain registration information may be maintained by domain name registries, which contract with domain registrars to provide registration services to the public. A domain name registry represents a database of all domain names and the associated registrant information.

An embodiment of the present invention may collect new domain registrations from various sources. The domain name registrations may be collected by an aggregator through a real-time or near real-time feed. The domain name registrations may be compared against a collection of known domain names. The known domain names may be generated, maintained and/or updated by an entity, e.g., company, financial institution, etc. For example, a computer server may identify legitimate domain names from valid emails. The valid emails may be customers, clients and/or other users associated with a company or other entity. For example, a legitimate client domain list may be identified or provided by a line of business (LOB) within a company. According to another example, a university may access a valid email list from student enrollment data. Other applications and variations may be applied.

An embodiment of the present invention is directed to a domain name engine that executes logic rules customized or programmed to capture instances where newly registered domains appear visually similar to legitimate client domains. Accordingly, the system may identify when a newly registered domain closely resembles that of a client. Upon identifying a lookalike domain name, the system may identify, collect and/or retrieve client information that may be distributed to an applicable LOB (and/or owner) via an automated electronic communication, e.g., email, text, voicemail, user interface, etc. The system may further determine whether a lookalike domain name is legitimate or not. The system may store lookalike domain registrations and provide analytics, feedback and reporting to better refine the underlying logic. An embodiment of the present invention may automatically generate a message with relevant information (e.g., domain name, potentially fraudulent name, and/or other associated information regarding the registration, etc.) for transmission to an internal recipient, as well as the domain name owner.

Domain name information may also be used to supplement a potential fraudulent effort. For example, a financial institution may recognize that a certain payment or other action may seem to diverge from a customer's pattern of behavior. The system may determine whether any issues have been raised concerning the domain name associated with a customer communication, in accordance with the analysis described herein.

According to another example, the domain name analysis may be used as part of risk-based decisioning. For example, an entity may determine whether to release a transaction or proceed with a transaction and determine whether the requesting domain name has been potentially compromised.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

FIG. 1 illustrates a schematic diagram of a system that identifies potentially fraudulent domain names, according to an exemplary embodiment. As illustrated, network 102 may be communicatively coupled with various sources of data.

For example, Registration Source 110 may provide registered domain names. Domain name data may be collected at a periodic basis, e.g., daily, etc. Domain name data may also be provided by Source 112, 114 may represent a vendor, aggregator or other entity that identifies registration data.

Network 102 may communicate with various sources, represented by 110, 112, 114. In addition, Network 102 communicates with Entity 130 that provides various services, products, processing and/or other features. Entity 130 may include a Domain Name Engine 140 that implements Logic Rules 142 to identify potentially fraudulent domain names. Valid domain names may be stored and managed by Database 152. Valid domain names may be retrieved from approved email address (e.g., name@company.com; etc.). Valid domain names may also be retrieved from reputable or known websites and/or other sources. Database 154 may store and maintain analytics, reports, trends and/or other data, etc. The domain name processing features described herein may be provided by Entity 130 and/or a third party provider, represented by 132, where Provider 132 may operate with Entity 130, for example. Domain Name Engine 140 may perform domain name processing, according to an exemplary embodiment of the present invention.

According to another embodiment, Domain Name Engine 140 may be implemented at a source entity, such as a Registration Source 110, Aggregator 112, and/or other registration entity, as represented by Source 114.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

The network 102 may be a wireless network, a wired network or any combination of wireless network and wired network. For example, the network 102 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 102 may support an Internet network, a wireless communication network, a cellular network, Bluetooth, or the like, or any combination thereof. The network 102 may further include one, or any number of the exemplary types of networks mentioned above operating as a stand-alone network or in cooperation with each other. The network 102 may utilize one or more protocols of one or more network elements to which it is communicatively coupled. The network 102 may translate to or from other protocols to one or more protocols of network devices. Although the network 102 is depicted as one network for simplicity, it should be appreciated that according to one or more embodiments, the network 102 may comprise a plurality of interconnected networks, such as, for example, a service provider network, the Internet, a cellular network, corporate networks, or even home networks, or any of the types of networks mentioned above.

Data may be transmitted and received via network 102 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Entity 130 may communicate with various recipients, LOB owners, managers, etc., via Communication Interface 144, using any mobile or computing device, such as a laptop computer, a personal digital assistant, a smartphone, a smartwatch, smart glasses, other wearables or other computing devices capable of sending or receiving network signals.

Entity 130 may be communicatively coupled to Databases 152, 154. For example, Database 152 may store and maintain legitimate domain names. Database 154 may store analytics, reports, trends, etc. Databases 152, 154 may include any suitable data structure to maintain the information and allow access and retrieval of the information. For example, Databases 152, 154 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Databases 152, 154 may be any suitable storage device or devices. The storage may be local, remote, or a combination thereof with respect to Databases 152, 154. Databases 152, 154 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Databases 152, 154 may have back-up capability built-in. Communications with Databases 152, 154 may be over a network, or communications may involve a direct connection between Databases 152, 154 and Entity 130, as depicted in FIG. 1. Databases 152, 154 may also represent cloud or other network based storage.

Figure 2:
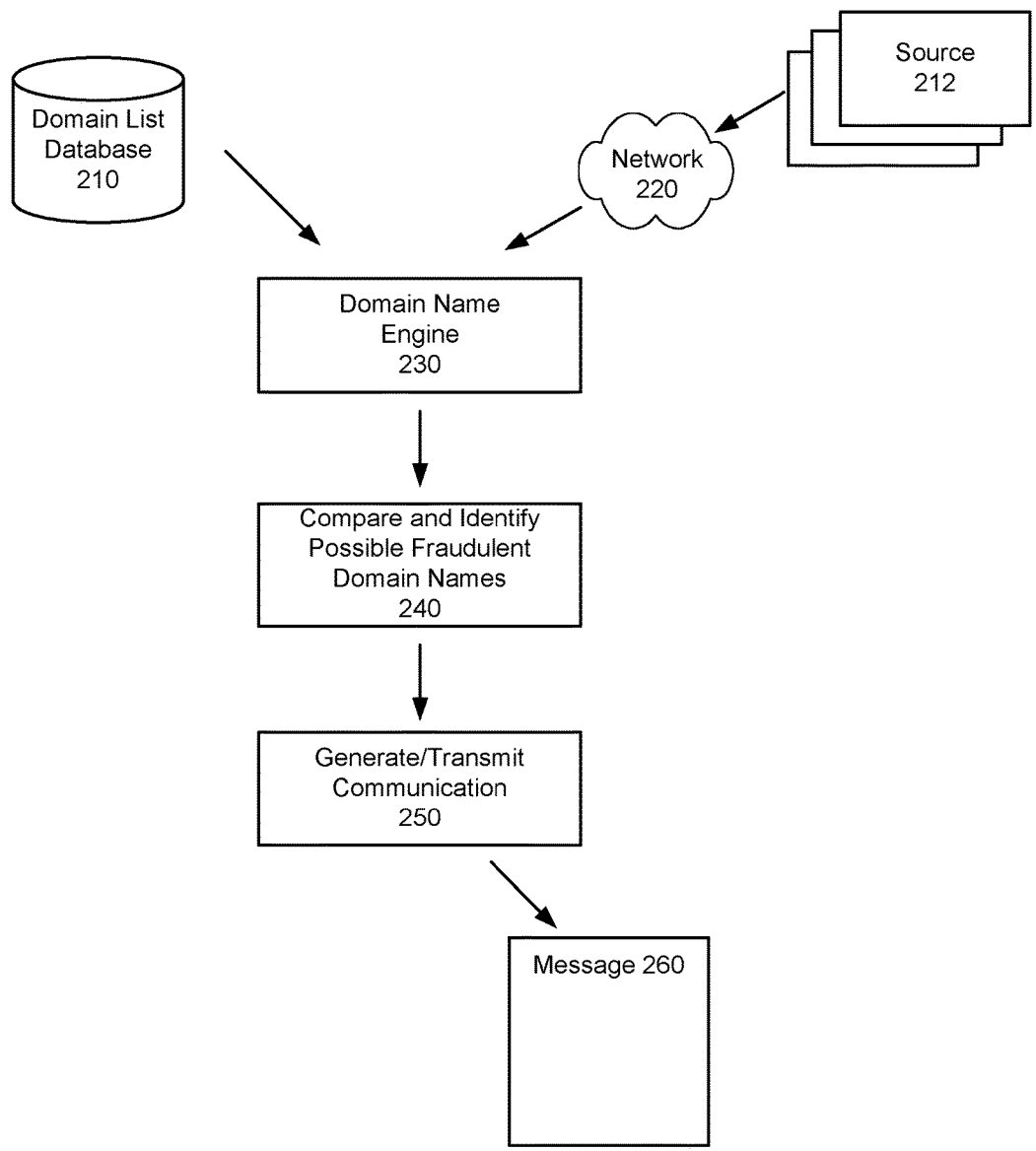
FIG. 2 is an exemplary flow diagram that illustrates identifying potentially fraudulent domain names, according to an embodiment of the present invention.

FIG. 2 is an exemplary flow diagram that illustrates identifying potentially fraudulent domain names, according to an embodiment of the present invention. In this illustration, Domain Name Engine 230 may receive inputs from a repository of valid domain names, represented by 210. Domain Name Engine may receive registered names via a network communication, through Network 220. The sources may be represented by 212. Domain Name Engine may collect registration data associated with the domain name registration. Registration data may include who registered the domain name, when the registration was made, where the registration came from (e.g., geographic area, country, location, registration address, etc.). Additional information may also include a report and/or search on the entity, prior history, transaction, etc. associated with the registering entity. The system may further consider risk analysis based on various factors, including geographic area (e.g., some locations have a higher fraud risk).

Domain Name Engine 230 may identify possible fraudulent activity based on programmed rules and/or logic that identify names that appear visually similar. As shown by 240, the system may compare valid domain names with newly registered domain names on a regular, periodic or other basis.

During the comparison, the system may also retrieve prior, related and/or associated fraud data relating to the domain name to further assess potential fraud and risk. This may also include identifying fraud or suspect activity associated with the registration entity, domain name, geographic area of registration, etc. As shown by 250, the system may generate an electronic communication, represented by Message 260, that informs a recipient of the potentially fraudulent domain name. Message 260 may include other information, including a registration information, fraud risk analysis, domain name owner, etc. Message 260 may also include the initial potentially fraudulent communication with the identified domain name, which may be part of the message, link or an attachment. The system may transmit Message 260 to an internal recipient to address the potential fraud. The system may also inform and transmit a message to the domain name owner.

Figure 3:
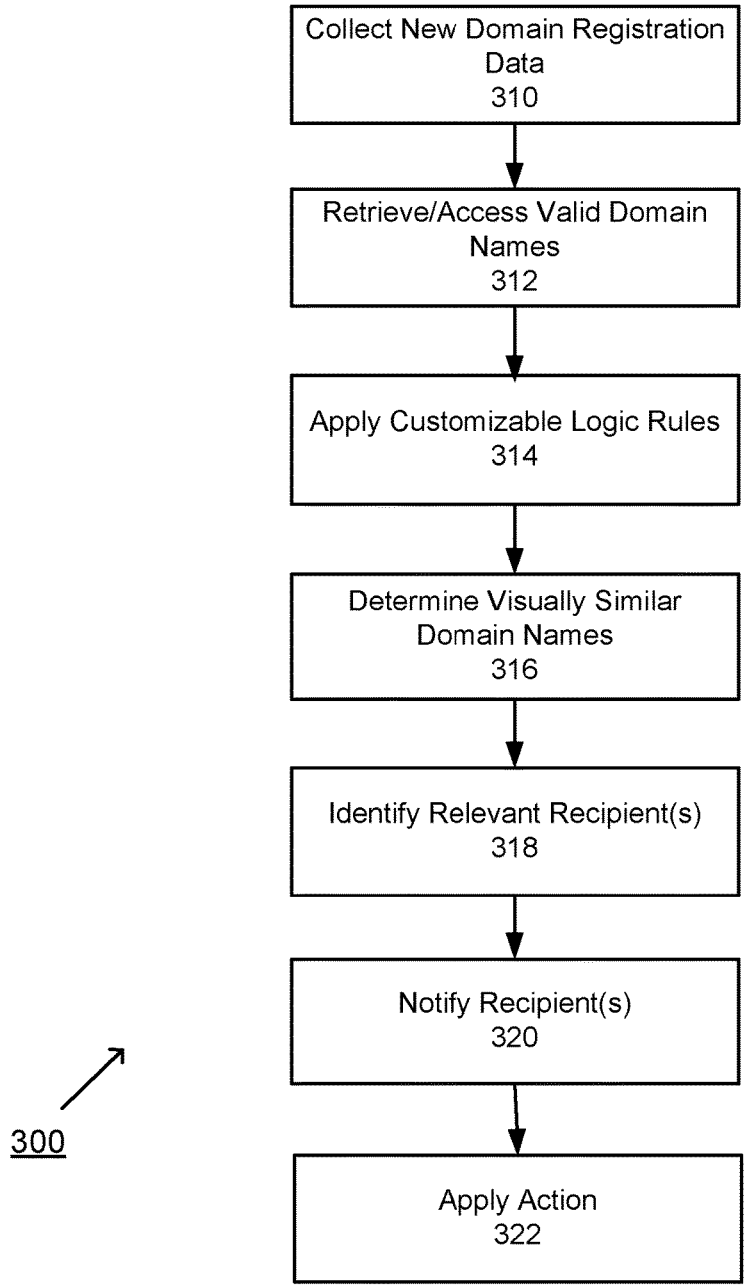
FIG. 3 is an exemplary flowchart that illustrates a method for identifying potentially fraudulent domain names, according to an embodiment of the present invention.

FIG. 3 is an exemplary flowchart that illustrates a method for identifying potentially fraudulent domain names, according to an embodiment of the present invention. At step 310, domain registration data may be collected. At step 312, the system may retrieve or access a legitimate or known domain names. At step 314, the system may apply customizable logic rules. At step 316, the system may identify visibly similar domain names. At step 318, the system may identify a relevant recipient. At step 320, the system may notify the recipient via an electronic communication. At step 322, the system may apply an appropriate action. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, domain registration data may be collected. In general, getting a domain name may involve registering the name with an organization, e.g., Internet Corporation for Assigned Names and Numbers (ICANN), through a domain name registrar. Third party domain name registrars may provide registration services. Domain names are generally sold by domain registrars that have access to DNS database. Many web hosting companies are also domain name registrars. Domain registration data may be collected every day, on a periodic basis, event based, at a user's request, and/or other schedule or trigger.

During the domain name registration process, a registering entity may be required to provide contact information, including registrant information, technical data, billing data and administrative specifics.

At step 312, the system may retrieve or access a legitimate or known domain names. Domain names may be identified from known sources. For example, the system may identify known email addresses and extract domain names from the addresses. Other sources may include websites, registration services, company records, for example. The system may also automatically update the list of legitimate names based on fraud analysis and/or other service.

At step 314, the system may apply customizable logic rules. For example, logic rules may include fuzzy logic rules that identify domain names that appear to be visually similar. Such logic may compare domain names that are similar where the differences may include an omission of a letter, an insertion of an additional letter, repetition of a letter, replacement of one letter for another, transposition of letters; homoglyph where two or more letters appear similar, and other rules as determined to be valuable. Some examples of logic rules may include replacing "i" for "l"; "i" for "y"; "t" for "f"; "g" for "q", "m" for "n"; "nn" for "m"; "y" for "ey"; "m" for "rn" and vice versa. Other rules that identify other types of visually similar names may be applied.

According to another example, the customizable fuzzy logic may also be applied to verify visually similar names. For example, a fraudster may modify a sender's name to appear legitimate. The modified sender's name may even be used with a legitimate domain name. This additional analysis may be used to determine whether a sender's name is visually similar but incorrect thereby indicating a potentially fraudulent activity. The customizable fuzzy logic may be applied to website names, identifiers and/or other names that may be altered to confuse and trick recipients and/or users.

At step 316, the system may identify visibly similar domain names. By applying logic rules, the system may identify visually similar domain names. The system may further identify relevant information for domain names that are detected as being visually similar. The system may retrieve registration information, e.g., who registered the domain name, when the registration was made, in what country/geographic area and/or other identifying information. The system may then use the registration information to identify trends, patterns, source and/or purpose of the registration. For example, some visually domain names may be legitimately registered to protect a company's brand or for other reasons. The system may confirm a domain name's legitimacy and store the relevant information for further analytics, reporting and/or processing. The system may identify a legitimate or authorized registration entity and thereby confirm authenticity (or lower a threat of potential fraud) based on the collected data.

At step 318, the system may identify a relevant recipient. Based on the domain name, a responsible owner or line of business (LoB) may be identified. Within a company or entity, there may be various lines of business, groups, teams, owners, managers, leaders, etc. that may be deemed responsible and the optimal entity to receive the information. The system may further associate certain domain names that pertain to a specific business within the company. This provides efficient follow-up and resolution of a potential fraud threat.

At step 320, the system may notify the recipient via an electronic communication. The system may automatically generate an electronic message that may include the possible fraudulent domain name, as compared to a legitimate domain name. The message may also include background, company and/or registration information to be sent to the LoB owner. The system may also identify a recommended action. The communication may include various forms of electronic communication, including email, voice, text, user interface. The communication may occur via various devices, including a user's mobile device, smart phone, wearable, tablet and/or any device with a computer processor.

At step 322, the system may apply an appropriate action. The appropriate action may include notifying a contact associated with the legitimate domain name. For example, the system may notify the domain name owner and verify any legitimate business reasons for registering a visually similar domain name. The system may also track other actions performed by the domain name register. Other courses of action may also be taken based on the business need, relationships and/or other considerations.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, FIG. 1 includes a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript, etc. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

The invention claimed is:

1. A system that analyzes domain names for potential fraud, the system comprising:
    a memory that stores and maintains a list of known legitimate domain names associated with an entity; and
    a computer processor, coupled to the memory, programmed to:
    receive, via an electronic input, one or more registered domain names from a registration source;
    access the list of known legitimate domain names;
    apply logic rules to determine visually similar domain names by comparing the one or more registered domain names to the list of known legitimate domain names;
    collect, to the extent not protected by a privacy shield, associated information relevant to each visually similar domain name registration comprising the registration entity, when the registration was made, and geographic location of the registration;
    determine if each visually similar domain name registration is fraudulent, the determination depending at least in part on the associated information for each visually similar domain name registration;
    identify a relevant recipient based on each visually similar domain name;
    generate and transmit, via a communication interface, a message to each recipient, the message comprising the visually similar domain name, a risk analysis relevant to a domain name owner, the associated information, and the determination of whether the visually similar domain name is fraudulent; and
    automatically adjust the list of known legitimate domain names based on the fraud determination.

2. The system of claim 1, wherein the one or more registered domain names are received via a feed.

3. The system of claim 1, wherein the recipient is part of a line of business associated with an entity.

4. The system of claim 1, wherein the computer processor is further programmed to:
    perform a risk analysis based on the associated information relevant to the domain name registration.

5. The system of claim 1, wherein the message comprises a communication from a visually similar domain name.

6. The system of claim 1, wherein an owner of the domain name is notified.

7. The system of claim 1, wherein the logic rules identify occurrences of omission, insertion, repetition, replacement and transposition.

8. The system of claim 1, wherein one or more registered domain names are received from a plurality of sources.

9. A method of analyzing domain names for potential fraud, the method comprising the steps of:
- receiving, via an electronic input, one or more registered domain names from a registration source;
- accessing the list of known legitimate domain names;
- applying logic rules to determine visually similar domain names by comparing the one or more registered domain names to the list of known legitimate domain names;
- collecting, to the extent not protected by a privacy shield, associated information relevant to each visually similar domain name registration comprising the registration entity, when the registration was made, and geographic location of the registration;
- determining if each visually similar domain name registration is fraudulent, the determination depending at least in part on the associated information for each visually similar domain name registration;
- identifying a relevant recipient based on each visually similar domain name;
- generating and transmitting, via a communication interface, a message to each recipient, the message comprising the visually similar domain name the associated information, a risk analysis relevant to a domain name owner, and the determination of whether the visually similar domain name is fraudulent; and
- automatically adjusting the list of known legitimate domain names based on the fraud determination.

10. The method of claim 9, wherein the one or more registered domain names are received via a feed.

11. The method of claim 9, wherein the recipient is part of a line of business associated with an entity.

12. The method of claim 9, further comprising the step of:
- performing a risk analysis based on the associated information relevant to the domain name registration.

13. The method of claim 9, wherein the message comprises a communication from a visually similar domain name.

14. The method of claim 9, wherein an owner of the domain name is notified.

15. The method of claim 9, wherein the logic rules identify occurrences of omission, insertion, repetition, replacement and transposition.

16. The method of claim 9, wherein one or more registered domain names are received from a plurality of sources.

* * * * *